FREQUENCY MODULATOR HAVING ELECTROMECHANICAL OSCILLATOR MEANS

Filed Aug. 11, 1955 4 Sheets-Sheet 1

INVENTORS
RALPH C. BLAUVELT, ROBERT N. LISTER &
GEORGE H. LISTER
BY
Hyde, Meyer, Baldwin & Doran
ATTORNEYS March 20, 1962 G. H. LISTER ETAL 3,026,488

FREQUENCY MODULATOR HAVING ELECTROMECHANICAL OSCILLATOR MEANS

Filed Aug. 11, 1955

4 Sheets-Sheet 2

*INVENTORS*
RALPH C. BLAUVELT, ROBERT N. LISTER &
GEORGE H. LISTER

*BY*

Hyde, Meyer, Baldwin & Doran

ATTORNEYS

INVENTORS
RALPH C. BLAUVELT, ROBERT N. LISTER &
GEORGE H. LISTER
BY
Hyde, Meyer, Baldwin & Doran
ATTORNEYS March 20, 1962 G. H. LISTER ETAL 3,026,488

FREQUENCY MODULATOR HAVING ELECTROMECHANICAL OSCILLATOR MEANS

Filed Aug. 11, 1955

4 Sheets-Sheet 4

INVENTOR.
RALPH C. BLAUVELT - ROBERT N. LISTER
GEORGE H. LISTER

BY

Hyde, Meyer, Baldwin & Doran

ATTORNEYS

United States Patent Office 3,026,488
Patented Mar. 20, 1962

3,026,488
FREQUENCY MODULATOR HAVING ELECTROMECHANICAL OSCILLATOR MEANS

George H. Lister, Robert N. Lister, and Ralph C. Blauvelt, Cleveland, Ohio, assignors, by mesne assignments, to Lee H. Peck, Cleveland, Ohio, trustee Filed Aug. 11, 1955, Ser. No. 527,852
9 Claims. (Cl. 332—26)

This invention relates to an improved method and apparatus for operating electromechanical oscillators at overtones and for producing frequency modulation of such electromechanical oscillators.

Hereinafter in the specification and claims, wherever we mention a crystal or a quartz crystal it will be understood that we are referring to any electromechanical resonator which exhibits what is at present known as a piezoelectric effect and which will function according to our teachings in the same manner as a quartz crystal, tourmaline, Rochelle salt crystals and barium titanate, to name some examples.

This application is a continuation-in-part of our copending application Serial No. 150,358, filed March 18, 1950 now abandoned, for Method and Apparatus for Operating Electromechanical Oscillators at Overtones and for Frequency Modulating Such Oscillators.

One of the objects of this invention is to provide a means whereby a piezoelectric crystal is made to exhibit the properties of an electrical capacity and to cause oscillator circuits to present conditions that will permit exceptionally stable crystal controlled oscillation.

Another object of this invention is to provide a method and apparatus for operating a piezoelectric crystal at high order overtones in which the crystal operates as an equivalent capacity. Means are provided to cause the terminals to which the crystal is connected, to appear as an equivalent inductance at the operating frequency.

Another object of this invention is to provide a means of operating certain cuts of piezoelectric crystals, which exhibit overtone activity, at a frequency just below any given overtone, and at that frequency the crystal is caused to exhibit the properties of a capacitive reactance. The circuit connected to the crystal is made to appear as an inductive reactance and a means is provided for causing the inductive reactance to vary thereby producing direct frequency modulation.

Another object of this invention is to provide a means for operating certain cuts of piezoelectric crystals, which exhibit overtone activity, at a frequency just above any given overtone. At that frequency the crystal is caused to exhibit an inductive reactance. The circuit connected to the crystal is made to appear as a capacitive reactance of such a value as to permit overtone operation and means is provided for varying the effective capacitance reactance to produce direct frequency modulation of the crystal.

One of the objects of the present invention is to so connect a variable reactance across an electromechanical oscillator as to produce direct frequency modulation of the oscillator.

Another of the objects of the invention is to provide a means of causing the frequency of an electromechanical oscillator to change, the direction of the change being dependent upon the polarity of the voltage causing the change and the amount being essentially dependent upon the amplitude of that voltage.

Another object of the invention is to provide a means for causing the frequency of an electromechanical oscillator to vary, that is, to cause its frequency to increase or decrease depending upon the polarity of the voltage causing the change. The amount of the frequency change is substantially dependent upon the amplitude of the voltage causing the change over a predetermined range. With amplitude beyond this predetermined range, the amount of frequency change rapidly tapers off to a point where large changes of amplitudes do not produce further changes in frequency. This provides means for holding communication channels within a definitely limited frequency band.

A further object of this invention is to provide a means for causing the frequency of an electromechanical oscillator to increase or decrease depending upon the polarity of the voltage which causes the change. The amount of the change in frequency for any given amplitude of modulating signal may be controlled by a simple adjustment of either a variable inductance or a variable capacitance, either of which may be calibrated for resetting to a precise value, when desired.

A further object of the invention is to provide operation of electromechanical oscillators at higher overtones (corresponding quite closely to the higher mechanical order harmonics) of the crystal wherein the frequency of the oscillator is exceptionally stable without modulations but which may be caused to vary in a direction depending upon the polarity of the modulating voltage. The amount of the change is a direct function of the amplitude of the modulating voltage over a predetermined range. Thereafter, the amount of change in frequency rapidly decreases so as to be no longer a function of the amplitude of the modulating voltage but rather being determined by the setting of the limits by means of a variable inductance or variable capacitance. This limiting effect is commonly referred to as automatic deviation control.

Another object of the invention is to provide a means for automatically compensating for the inherent temperature coefficient of electromechanical crystals, and the temperature coefficients of the tuned circuits of oscillator circuits using electromechanical or piezoelectric crystals as the frequency determining element.

A further object of the present invention is to provide an oscillator circuit including an electromechanical crystal in its holder, wherein said crystal has a shunt capacitance due to the holder and its connection in the circuit, together with means for tuning this capacitance to a small value not nearly as small as the equivalent internal capacitance of the crystal but much less than that appearing in the typical piezoelectric oscillator circuit at the fundamental frequency of the crystal, or at a selected overtone, by connecting into the circuit the electrical equivalent of an inductance, and selecting that point where the inductive reactance and capacitive reactance are at a maximum and below the fundamental frequency of the electromechanical crystal.

Other objects and advantage of the present invention will be apparent from the accompanying drawings and description and the essential features will be set forth in the appended claims.

In the drawings—

FIG. 21 is a curve plotting values of the inductance L, added in parallel with the crystal to obtain various operative frequencies with a 5.0 megacycle crystal; while

Figure 1:
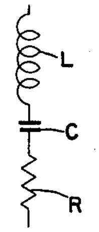
FIG. 1 is a diagram showing the electrical value inherent in a crystal.

In an oscillator circuit, wherein the frequency determining element is an electromechanical crystal, quartz as an example, the output frequency is determined primarily by the thickness of the crystal and type of cut of the crystal, that is, the angles the surfaces of the crystal make with the major axis of the mother crystal. The electrical equivalents of the mechanical properties of the crystal, that is, in most crystals used for frequency control purposes, are a very large inductance, a very small capacity and a relatively low value of resistance. These values are shown in the diagram of FIG. 1 as inductance L, capacity C and resistance R.

In a typical quartz crystal having a natural frequency of 10 megacycles, the electrical equivalents of the above mentioned mechanical properties might have the following values:

$$L=.02533 \text{ henry}$$
$$C=.01 \text{ mmfd.}$$
$$R=250 \text{ ohms}$$

$$Q=\frac{2\pi f L}{R}=6364 \text{ (approximately)}$$

$f$=cycles per second

Figure 2:
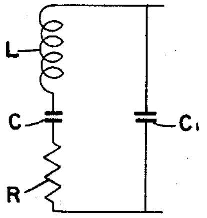
FIG. 2 is a diagram similar to FIG. 1 but showing an additional capacitance effect which appears across the crystal when it is placed in a holder for the attachment of electrodes.

Such a crystal is not useable as it must have electrodes to apply electrical energy to the crystal. Such electrodes, together with the crystal as a dielectric, cause a capacity $C_H$ to appear across the series circuit L, C and R, as illustrated in the diagram of FIG. 2.

Figure 3:
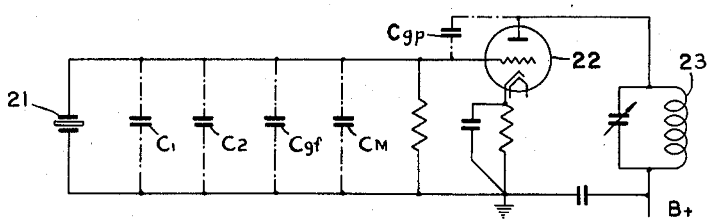
FIG. 3 is a diagram showing a crystal in a typical oscillator circuit and indicating certain capacitances which are effective in said circuit, this circuit we have called in the specification and claims a "typical piezoelectric oscillator circuit"

In FIG. 3 we have shown a crystal in its holder indicated at 21 connected in a typical oscillator circuit, which includes a triode tube 22, a tuning circuit 23 and a source of B+ current. In FIG. 3 we have illustrated as capacities certain values which appear from the connection in the oscillator circuit in addition to the capacity $C_H$ mentioned previously. These consist of the wiring capacity, the tube input capacity and the "Miller effect." The "Miller effect" is usually the largest value, in fact, it is often larger than all of the others combined. In the circuit of FIG. 3, $C_H$ is the crystal holder capacity; $C_2$ is the wiring capacity; $C_{gf}$ is the tube grid to filament capacity; $C_{gp}$ is the tube grid to plate capacity and $C_M$ is the "Miller effect." If a tube with a grid to plate capacity of 2 mmfd. is chosen for the oscillator tube and the circuit gain (G) is 10, the "Miller effect" is $$C_M=C_{gp}\times(G+1)=2\times(10+1)=22 \text{ mmfd.}$$

In the tube chosen, if $C_{gf}$ is 2 mmfd. and $C_2$ is 3 mmfd. and $C_H$ is 5 mmfd., then the total capacity $C_1$ across the crystal terminals is the sum of these capacities together with the above mentioned "Miller effect," namely $$22+2+3+5=22 \text{ mmfd.}$$

As stated previously, the crystal itself behaves exactly like a series resonant circuit and, as such, the capacitive reactance $$X_c\left(-\frac{1}{2\pi f C}\right)$$

equals the inductive reactance $X_L(2\pi f L)$ at the resonant frequency. As such, it is not useable in any circuit as no means is provided to couple energy to the crystal. The addition of electrodes and the other capacities (as mentioned above in an oscillator circuit) then result in a circuit in which the crystal appears as an equivalent inductance shunted by a capacity. This is true since a series resonant circuit of say 10 megacycles appears as an inductive reactance when operated at a frequency higher than the resonant frequency. This resultant equivalent inductance shunted by the external capacity is anti-resonant (parallel resonance) at a frequency slightly higher than the series resonant frequency of the crystal itself.

Figure 4:
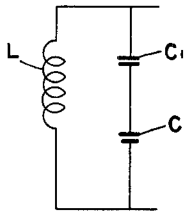
FIG. 4 is a diagram similar to FIG. 2 with the resistance omitted and with the capacitances arranged in a slightly different manner.

This can be shown in another way if the diagram of FIG. 2 is redrawn as FIG. 4 using the total capacity C across the terminals instead of holder capacity $C_H$. This illustrates that the two capacities C and $C_1$ are actually in series. The total of these two capacities in series equals $$\frac{C\times C_1}{C+C_1}$$

which always results in a total capacity less than C alone. This new value of total capacity, together with the inductance L is anti-resonant at a frequency higher than the series resonant frequency of the crystal since $$f=\frac{1}{2\pi\sqrt{L\times C}}$$

The circuit then becomes a high impedance circuit, the value of which is determined by the Q of the crystal, the value of L and the frequency involved. Parallel impedance at resonance$=Q\times 2\pi x f\times L$.

The crystal and its associated capacities as a parallel resonant circuit becomes useful as the frequency determining element of an oscillator only if the value of shunt capacity $C_1$ is not too large in proportion to the electrical equivalent C of the crystal itself. Briefly it can be stated that if the value of $C_1$ is very large in comparison with C, the resultant parallel resonant circuit is anti-resonant too near to the series resonant frequency of the crystal itself because the equation $$\frac{C\times C_1}{C+C_1}$$

approaches C when $C_1$ is large in proportion to C. The result of having a large value of $C_1$ in proportion to C is to have a crystal oscillator that is difficult to start and difficult to maintain in oscillation, but one that is especially "tight" and not subject to frequency changes with changes in circuit parameters.

Figure 5:
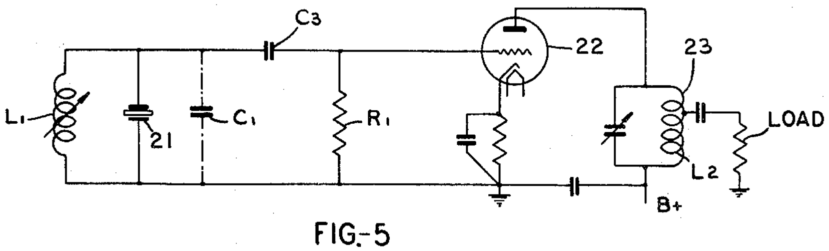
FIG. 5 is a diagram similar to FIG. 3 but showing an inductive reactance connected in parallel with crystal terminals to reduce the capactive effect appearing across those terminals.

The copending application of Albert R. Panetta, Serial No. 63,066, filed December 2, 1948, for a System for Using Overtone Activity of Quartz Crystals, now Patent No. 2,613,320, granted October 7, 1952, recognizes the above facts and brings about operation of crystal oscillators at high order overtones by greatly reducing the capacitive effect appearing across the crystal terminals by connecting in parallel with the crystal terminals an inductive reactance or an electrical network exhibiting the properties of an inductive reactance as illustrated in the diagram of FIG. 5 where the additional inductive reactance is indicated at $L_1$. This added inductance or inductive reactance $L_1$ is of such a value as to reduce the effect of $C_1$ to obtain the necessary ratio of $C_1$ to C, needed for operation at the overtone selected. $C_3$ is simply an isolating condenser to prevent the inductance from short circuiting the grid resistor $R_1$. Its value is relatively unimportant provided it is large enough to properly couple the crystal circuit to the tube 22.

Experimental data at higher frequency overtones show that it is safe to assume that the inductance and capacity equivalents of the mechanical properties of a crystal decrease with an increase of overtone (nearly multiples) of crystal operation. The crystal mentioned above having the values as shown, will have approximately the following values at the overtone indicated.

| Freq. | Fundamental, 10 mc. | 9th Overtone, Approx. 90 Mc. | 15th Overtone, Approx. 150 Mc. |
|---|---|---|---|
| L | .02533 Hy | .002814 Hy | .00169 Hy. |
| C | .01 mmfd | .00111 mmfd | .000667 mmfd. |
| R | 250 ohms | very approx. 2,250 ohms. | very approx. 3,750 ohms. |
| Q | 6,364 | very approx. 707 | very approx. 424. |

Since $C_1$ remains quite constant, the ratio of $C_1$ to C increases as the overtone increases, resulting in a "tight" or inoperative crystal at overtones other than the fundamental.

FIGS. 6 to 13 inclusive will illustrate the teachings of the above mentioned Panetta patent and will show the addition of our new teachings to that of Panetta so as to provide a new result.

Figure 6:
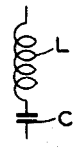
FIG. 6 is a diagram similar to FIG. 1 but omitting the resistance.
Figure 7:
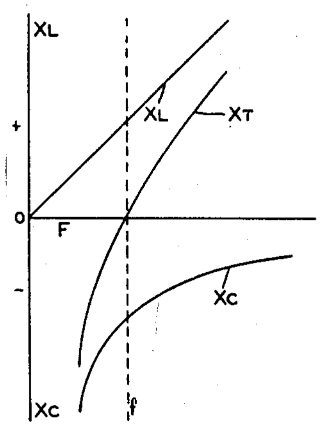
FIG. 7 is a plotting of the reactance of FIG. 6.

FIG. 6 is a diagram similar to FIG. 1 but omitting the resistance R since the ratio of the value L to the value of R is so very great that R may be neglected in the following discussion. FIG. 7 is a plotting of the values of the reactances of FIG. 6. The line $X_L$ is a plotting of the reactance of L and equals $2\pi fL$. The line $X_C$ is a plotting of the values of the reactances of C and equals $$-\frac{1}{2\pi fC}$$

The line $X_T$ is an addition of the values of $X_L$ and $X_C$ since reactances may be added algebraically in a series circuit. The broken line $f$ of FIG. 7 then represents the resonant frequency where the capacitive reactance equals the inductive reactance.

Figure 8:
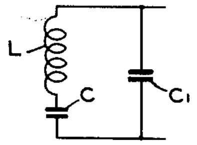
FIG. 8 is a diagram similar to FIG. 2 but omitting the resistance.
Figure 9:
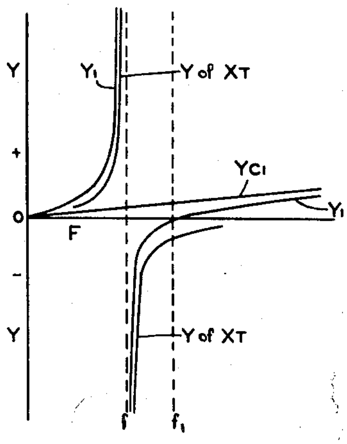
FIG. 9 is a plotting of the susceptance of FIG. 8.

In FIG. 8, the elements of FIG. 2 are diagrammed omitting the resistance R which is of such a small value that it need not be taken into account in this discussion. FIG. 9 is a plotting of the susceptances of the electrical values of FIG. 8. Here the two part curve Y is a plotting of the susceptances corresponding to the reactances of the curve $X_T$ of FIG. 7. Since the susceptance is the reciprocal of the reactance, the line $f$ of FIG. 9 shows the two parts of the curve Y going to infinity at the same point where the curve $X_T$ of FIG. 7 crossed zero. In FIG. 9, the susceptances of the electrical value $C_1$ have been plotted as the line $Y_{C_1}$. Since susceptances can be added algebraically in a parallel circuit, the values of $Y_{C_1}$ have been added to the values of the curve Y to produce the new curves $Y_1$ of FIG. 9. It will be noted that the curve $Y_1$ crosses the zero line at the broken line $f_1$ where the capacitive susceptance and inductive susceptance are equal. This $f_1$ then indicates the anti-resonant frequency of the crystal plus its parallel capacity.

Figure 10:
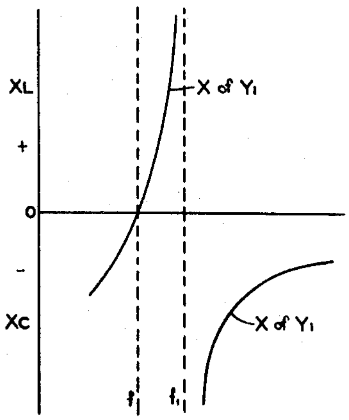
FIG. 10 is a plotting of the reactances of FIG. 8.

In FIG. 10, the reactance of the values of the curve $Y_1$ of FIG. 9 have ben plotted. Here the reactance values approach infinity at the line $f_1$ which is the same point at which the susceptance of FIG. 9 was zero.

Figure 11:
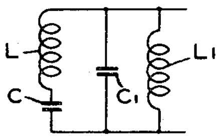
FIG. 11 is a diagram similar to FIG. 8 but wherein an inductive reactance has been connected across the crystal terminals to parallel therewith.
Figure 12:
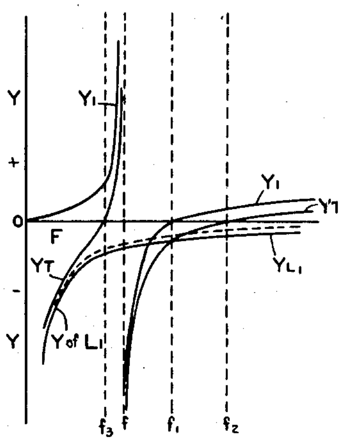
FIG. 12 is a plotting of the susceptances of FIG. 11.
Figure 13:
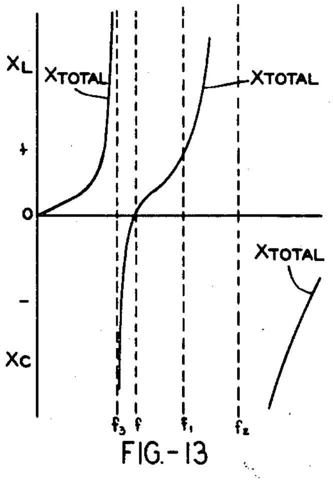
FIG. 13 is a plotting of the reactances of FIG. 11.

The diagram of FIG. 11 shows the connection of an inductance or an inductive reactance $L_1$ across the crystal holder terminals in parallel therewith so as to increase the impedance and make possible oscillation at the higher overtones as taught in the above mentioned Panetta patent. The diagram of FIG. 12 is a plotting of the susceptances of the electrical values of FIG. 11. The curve $Y_1$ of FIG. 12 is the curve $Y_1$ of FIG. 9. The curve $Y_{L_1}$ is a plotting of the susceptance of the inductance $L_1$. The curve $Y_T$ of FIG. 12 shows the algebraic additions of the values of the curve $Y_{L_1}$ to the curve $Y_1$ giving the two part curve $Y_T$. It will be noted that at two frequencies, namely, $f_2$ and $f_3$ of FIG. 12, the curve $Y_T$ crosses zero. This establishes the resonant frequency $f_2$ which is further removed from the series resonant frequency $f$ than the previously established anti-resonant frequency line $f_1$. It also establishes the resonant frequency $f_3$ which is below the series resonant frequency line $f$. FIG. 13 is a plotting of the reactances of FIG. 12 and gives the curves marked $X_{Total}$ which approach infinity at the frequencies $f_2$ and $f_3$.

In FIGS. 7, 9, 10, 12 and 13 the points $f$, $f_1$, $f_2$ and $f_3$ are only relative and refer either to the fundamental crystal frequency or to the overtone frequency. In all cases, $f$ on the curves is the series resonant condition of the crystal at the fundamental or at the overtone selected.

In a crystal oscillator $f_2$ is the operating frequency; L is the electrical equivalent of the mass of the crystal (stated in henries); C is the electrical equivalent of the spring action or restoring force of the crystal (stated in farads); R is the electrical equivalent of the friction involved in flexing or movement of the crystal during oscillation (stated in ohms). Since the R value is in a series circuit, comprising L, C and R, R may be omitted from the calculations with but little effect on the overall result except that a high value of R may cause weak or erratic operation of the circuit. $X_L$ is the reactance of L and is equal to $2\pi f_2L$. The sign of the value is always positive (+). $X_C$ is the reactance of C and is equal to $$\frac{1}{2\pi f_2C}$$

The sign of the value is always negative (−). $X_T$ is total reactance of the crystal. $X_T=X_L-X_C$. (The sign of the value of $X_T$ may be + or − depending on the magnitudes of the values of $X_T$ and $X_C$.) $C_1$ is the total capacity, including the crystal holder capacity, appearing across the crystal terminals. $X_{C_1}$ is the reactance of $C_1$ and is equal to $$\frac{1}{2\pi f_2C_1}$$

The sign of the value of $X_{C_1}$ is always negative (−). $L_1$ is the inductance of the shunt coil or the equivalent inductance of an electrical circuit that exhibits the properties of an inductance (in henries). $X_{L_1}$ is the reactance of $L_1$ and is equal to $2\pi f_2L_1$. The sign of the value of $X_{L_1}$ is always positive (+).

Then $$\frac{1}{X_T}\text{(as in Fig. 7)}+\frac{1}{X_{C_1}}\text{(as in Fig. 9)}=\frac{1}{X_{L_1}}\text{(as in Fig. 12)}$$

This equation provides a method by which the value of $L_1$ may be determined for any given operating frequency when the crystal constants and circuit values are known or can be measured. Also given a value of $L_1$ and crystal constants the circuit values may be determined for any operating frequency within a range over which the crystal will operate.

This same equation may also be used to determine the amount of frequency change that may be obtained by varying either the value of $L_1$ or $C_1$ or both.

This equation while it appears as though it were of the most simple form comprises very complex numbers.

$$\frac{1}{X_T}+\frac{1}{X_{C_1}}=\frac{1}{X_{L_1}}$$

is the equivalent of $$\frac{1}{2\pi f_2 L-\left(\frac{1}{-2\pi f_2 C}\right)}+\frac{1}{\frac{1}{2\pi f_2 C_1}}=\frac{1}{2\pi f_2 L_1}$$

Solving for $L_1$:

$$L_1=(2\pi f_2 C_1)-(2\pi f_2 C)+[(2\pi LC)(4\pi^2 f_2^2 C)]$$

This equation indicates that $f_2$ may be either below or above $f$ ($f$ is the series resonant frequency of the crystal at its fundamental frequency or series resonant frequency at an overtone) provided that the value of $L_1$ is such that the equation is satisfied.

Figure 21:
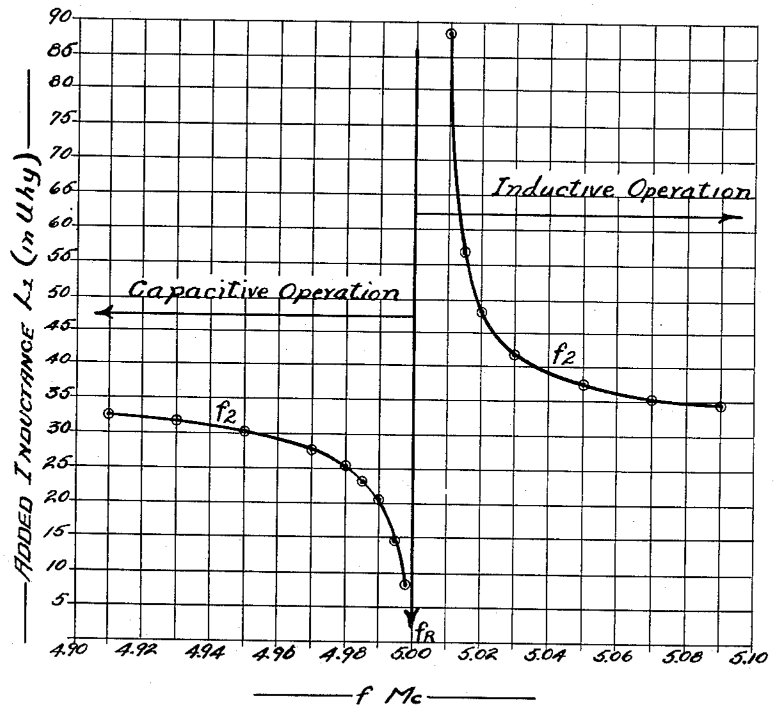

We may by means of this equation, use a given set of crystal values, a fixed value of total capacity across the crystal and solve for $f_2$ for a number of values of $L_1$ and plot $f_2$ against $L_1$ and obtain a curve like that of the curve of FIG. 21. FIG. 21 is a composite curve drawn from the results of a series of calculations using various values of $L_1$ in the equation:

$$L_1=(2\pi f_2 C_1)-(2\pi f_2 C)+[(2\pi LC)(4\pi^2 f_2^2 C)]$$

Operation of the crystal oscillator circuit at a frequency above (to the right) of the series resonant frequency at an overtone is basically the Panetta patent. This is shown in the upper right-hand portion of FIG. 21. Operation of the crystal oscillator in this range to produce frequency modulation at a frequency above the series resonant frequency at an overtone is part of the present invention.

Operation at any point below the series resonant frequency at the fundamental frequency or at an overtone whether simply as an oscillator or a frequency modulated oscillator is also the invention of this present application. This is shown in the lower left-hand portion of FIG. 21.

A curve similar to FIG. 21 may be obtained by using a fixed value of $L_1$ and varying $C_1$.

Figure 22:
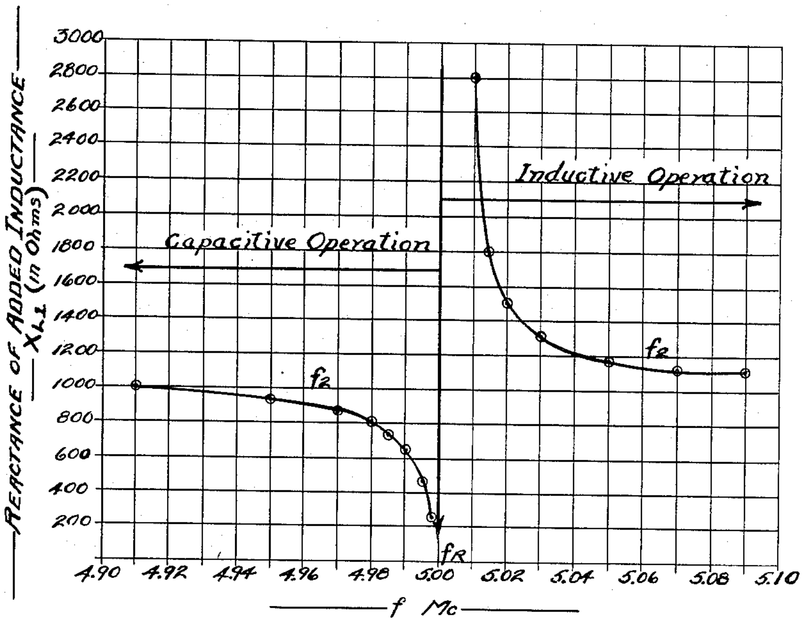
FIG. 22 is a similar curve but plotting the values of FIG. 21 as reactances.

FIG. 22 is the result of this same method except that the value of added inductance is converted into reactance ($2\pi fL$).

It will be apparent to those skilled in the art that the method described in connection with the lower, left-hand portion of the curves of FIGS. 21 and 22 causes the entire oscillator input circuit, excluding the crystal itself, to be inductive and as such the crystal will assume the properties of an equivalent capacity and operate at a frequency below the series resonant frequency $f_r$ of the crystal at its fundamental or below the series resonant frequency $f_r$ at an overtone.

It can be shown that the effect of varying either $L_1$ or $C_1$ in such an oscillator produces a frequency change of the order of $1/1500$ of that which would take place if the oscillator were to be used without the crystal as in the usual self excited oscillator. This small change in frequency with changes in $L_1$ or $C_1$ indicate the excellent frequency stability of our oscillator.

The operation of a crystal oscillator at a frequency below the series resonant frequency of the crystal is impossible without this method of making the input circuit of the oscillator inductive so that the crystal appears as capacitive. All other oscillator circuits are either capacitive or resistive on their input circuits so that the crystal appears as inductive and cannot put to use the excellent properties of crystals that operate below the series resonant frequency ($f_r$).

Actually the two frequencies $f_2$ and $f_3$ are very close together and the above mentioned Panetta patent mentions that the frequency $f_2$ has the desired qualities for constant crystal effect while the frequency $f_3$ is unstable.

We have found that the frequency $f_3$ is not unstable but can be utilized to provide frequency modulation of a very desirable character. Actually the frequency $f_3$ of Panetta turns out to be a switching of the frequency curve from the upper right-hand (inductive crystal) operation of FIGS. 21 and 22 to the lower left-hand (capacitive crystal) operation.

To illustrate how close the frequency $f_2$ (right side FIG. 22) is to $f_2$ (left side FIG. 22), it may be stated that a crystal rated at 8.68 mc. can be operated by the Panetta method at the ninth overtone (approximately the ninth harmonic) or 78.12 mc. (78,120 kc.). At this frequency, the crystal is so tight that it cannot be modulated. Normally one would expect that the frequency should be raised a little above 78,120 kc. to loosen the crystal. Instead, we have discovered that if the inductance $L_1$ is increased to cause the frequency to go down to, say, 78,110 kc. the crystal can then be frequency modulated. In the above example, the modulation capability takes place in a matter of ten or twenty kilocycles in a total of 78,120 kc.

We found that there are two values of the added inductance $L_1$ that will produce operation at an overtone where the frequency of operation is very close to the series resonant frequency. In fact these three frequencies, the series resonant frequency $f_r$, the extremely "tight" frequency $f_2$ above $f_r$ and the extremely "tight" frequency $f_2$ below $f_r$ of FIG. 22 are or can be within 200 cycles per second which is within $\pm .00013$ percent at 78,120 kc.

The very small difference between the two operating frequencies makes it extremely difficult to determine whether the crystal is operating as an equivalent capacitance or as an equivalent inductance. If one has a "tight" crystal very close to $f_r$, increasing the added inductance $L_1$ will cause the oscillator to stop if the crystal is inductive (right-hand side of FIGS. 21 and 22); or increasing $L_1$ will decrease the frequency to say 78,110 kc. and the crystal oscillator can be frequency modulated. The crystal under these conditions is operating as an equivalent capacitance (left-hand side of FIGS. 21 and 22).

Either type of crystal operation may be frequency modulated by adjustment of the value of added $L_1$ to move the operating frequency away from $f_r$ and then adding a reactance modulator to the crystal circuit. The operation below $f_r$ (as an equivalent capacitance) is preferred because the change in frequency with a change in reactance across the crystal is more nearly linear.

Figure 14:
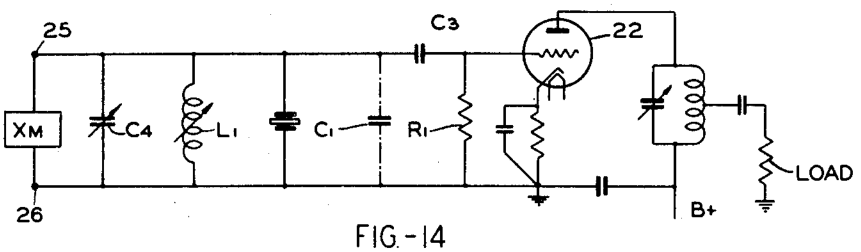
FIG. 14 is similar to the diagram of FIG. 5 but showing the addition of a modulating reactance.

The relationship between our invention and that described in the above mentioned Panetta patent may be explained by stating that in the Panetta patent, the system requires that the capacitive effect across the crystal be reduced to obtain approximately the same ratio of $C_1$ to C which is required to obtain normal crystal operation at the crystal fundamental $f$ when one of the higher order overtones is selected, while, in our invention, the capacitive effect across the crystal must be reduced slightly further to obtain a ratio of $C_1$ to C which is slightly less than that required in the Panetta patent. This might be accomplished by the addition of a variable reactance in the form of a variable inductance, variable condenser, or electrical network, such as a reactance modulator across the crystal, or by use of a variable plug in, or movable part of, a crystal holder or electrode. In actual practice, we have used an inductance coil with a powdered iron core held in place by a fine threaded connection to supply the inductance $L_1$ of FIG. 5. When this has been adjusted to achieve the stable crystal frequency at $f_2$ as taught in the Panetta patent, then the plug core is screwed into the coil so as to slightly increase the inductance as indicated diagrammatically by the dotted line generally parallel to the curve $Y_{L_1}$ of a curve drawn similar to FIG. 12 except to represent the conditions of a crystal operating as an equivalent capacity. This will select a frequency slightly to the left of the point "*f*." A reactance modulator $X_M$ connected across the crystal terminals as indicated in FIG. 14, when the frequency of the crystal has been adjusted as just described, will then produce direct frequency modulation. The direction of the change due to this modulation will be dependent upon the polarity of the voltage causing the change and the amount within predetermined limits is essentially dependent upon the amplitude of that voltage.

In a circuit such as that shown in FIG. 5, if the crystal has 10 mc. fundamental frequency and operation is desired at the ninth overtone with $C_1$ being the total of $C_H$, $C_2$, $C_{gf}$ and $C_M$ of FIG. 3, totaling 32 mmfd., the inductive reactance of $L_1$ must be of such a value to reduce the effect of $C_1$ to that of a capacity of approximately 3.5 mmfd. Throughout this example we have chosen the ninth overtone. Note that the remaining capacitive effect of $C_1$ at this overtone is approximately one-ninth of that appearing as $C_1$ when the crystal is used in an ordinary circuit at the crystal fundamental as in FIG. 2. For other overtones, the value of effective $C_1$ varies approximately directly in proportion to the overtone selected and $L_1$ is chosen to bring this about. For normal crystal operation, the inductive reactance of $L_1$ would be carefully adjusted to provide stable crystal operation. Further reduction of the capacitive effect of $C_1$ by adjustment of $L_1$ as described above, then provides only a small change of frequency but loosens up an otherwise tightly fixed, stable frequency of the crystal. The addition of a variable reactance in the form of a variable inductance, variable condenser, or electrical network, such as a reactance modulator, or variable plug in the crystal holder electrode or electrodes, across the crystal, will cause the frequency of the crystal oscillator to vary at a rate determined by the signal applied to the modulating reactance and in a direction depending upon the polarity of the voltage applied to the modulating reactance. As mentioned above, one form of using our invention is to provide a movable plug core in an inductance coil so as to loosen up the tight crystal and then the application of a reactance modulator $X_M$ as shown in FIG. 14 to provide the signal.

Referring further to FIG. 14, it will be apparent to those skilled in the art that an additional condenser $C_4$ may then be cancelled out by setting $L_1$ to the proper value. This condenser will then provide a fine adjustment of the amount of effect that any value of reactance of $X_M$ will have on the circuit. The inductance of $L_1$ may also be supplied with an adjustment to change its value to provide the same effect as $C_4$.

Inasmuch as only a small amount of injected reactance is needed to produce frequency modulation by this method, it is desirable to provide a means of limiting the amount of injected reactance that is applied across the crystal. It is also desirable to limit the injected reactance because excessive amounts can cause the crystal to become inoperative since the remaining value of capacitive effect of $C_1$ may be cancelled out entirely or it may be made too large, either of which will cause the crystal to stop oscillating.

Figure 15:
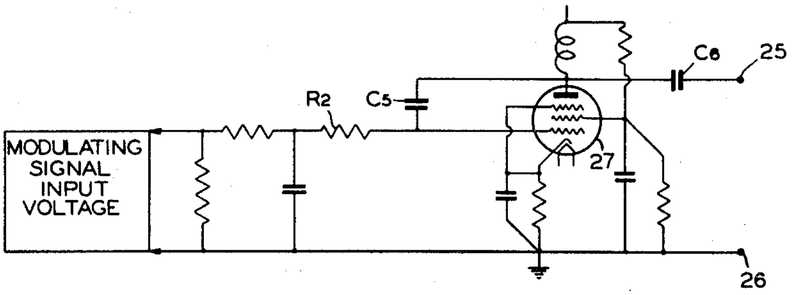
FIG. 15 is a diagram of a reactance modulator circuit.

A common reactance modulator circuit known to the radio art is illustrated diagrammatically in FIG. 15. Other reactance modulator circuits might be used equally well, but our invention will be described in connection with the circuit of FIG. 15. This reactance modulator circuit (quadrature tube) used as an example, injects capacitive reactance across the terminals 25 and 26 which might, in the circuit of FIG. 14, be connected directly across the crystal at the terminals numbered 25 and 26. This method of modulation and its means for limiting frequency deviation might be used to modulate any oscillator and need not be strictly limited to modulating crystal oscillators.

The value of capacity exhibited across the terminals 25 and 26 is dependent upon the trans-conductance of the tube 27 ($G_M$), the value of $C_5$, and the value of $R_2$, and the value of the reactance of this capacity will also be a function of the frequency involved. If the reactance $$\left(-\frac{1}{2\pi fC}\right)$$

of $C_5$ is five or more times that of the resistance $R_2$, the injected capacity $C_I$ equals $G_M \times R_2 \times C_5$. Any change in $G_M$ causes a corresponding change in $C_1$. This is usually done by causing the grid voltage to change by applying the modulating signal to the grid of tube 27.

Figure 16:
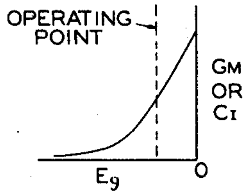
FIGS. 16, 17 and 18 are operating curves showing a plotting of certain values of the space discharge tube of FIG. 15, FIG. 17 showing the effect of FIG. 16 when certain values are changed and FIG. 18 showing the change in FIG. 17 by the addition of a condenser as taught in FIG. 15.
Figure 17:
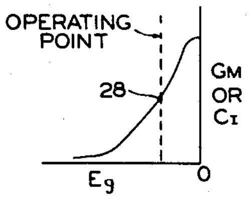
Figure 18:
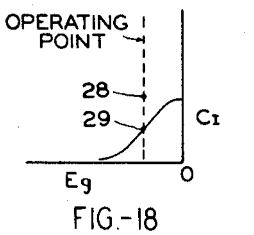

The usual tube connected as in FIG. 15, has a $G_M$ to $E_g$ curve as shown in FIG. 16. $E_g$ represents the modulcaint signal input voltage. Since $G_M$ and $C_I$ change together, the ordinates on the vertical axis may be designated by either designation. By reducing the screen grid voltage of the tube 27 by any one of several well known methods, to a relative low value, and stabilizing that value, the curve of FIG. 16 may be modified as shown in FIG. 17 resulting in a flattening at both ends of the curve but causing non-linearity over the rest of the curve. The addition of a condenser $C_6$ (as shown in FIG. 15) of such a value as to be equal to the injected value of $C_I$ at the operating point indicated in FIGS. 16, 17 and 18, results in a curve as shown in FIG. 18. This straightens out the intermediate portion of the curve but flattens both ends thereof. As mentioned previously, $C_I$ is proportional to $G_M$ since $C_5$ and $R_2$ remain constant. In one form of our device, $C_I$ at the operating point 28 in FIG. 17 is equal to 4 mmfd. In such a case, we select the condenser $C_6$ of a value of 4 mmfd. Since these two values are in series, the resultant curve of FIG. 18 has a value of 2 mmfd. at the point 29 or approximately one-half the value of $C_I$ at the operating point without the condenser $C_6$. The limiting values of these two capacities in series would then vary between limits of zero at the left-hand end of the curve of FIG. 18 and 4 mmfd. at the right-hand end of the same curve.

By connecting such a variable reactance across the terminals 25, 26 of FIG. 14, with the limitation at each end of the curve as described in connection with FIG. 18, or by connecting the same variable reactance across a part of $L_1$ of FIG. 14, the frequency change becomes quite linear with the modulating signal and the frequency will increase or decrease depending upon the polarity of the voltage causing the change. At the same time, the amount of the frequency change will be essentially dependent upon the amplitude of the voltage within the limitations of the curve of FIG. 18 or a somewhat similar curve. But the frequency band is held to a predetermined width on opposite sides of the operating frequency point as set by $L_1$ or $C_4$. This prevents the cancelling out entirely of the capacitive effect of $C_1$ or prevents the same from becoming too large, either of which would cause the crystals to stop oscillating, or, if the changes went beyond certain limits, they would cause the communication to be unsatisfactory.

A resistance modulator injecting inductive reactance instead of capacitive reactance might also be connected according to the teachings of our invention to produce like results as will be understood by those skilled in this art.

Figure 19:
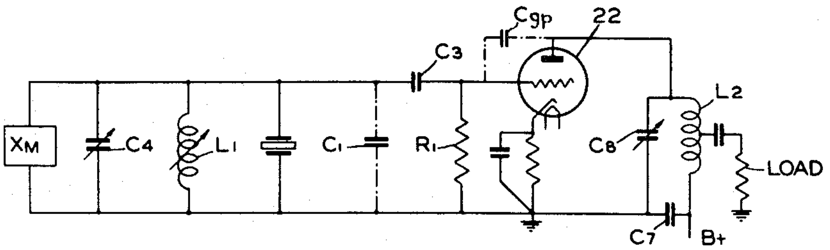
FIG. 19 is a diagram similar to FIG. 14 with the addition of means for automatically compensating for the inherent temperature coefficient of the electromechanical crystal.

As stated previously, the "Miller effect" is effectively across the crystal. The "Miller effect" is a product of the grid-to-plate capacity of the tube and the gain of the circuit. The gain of the circuit is related to the tuning of the plate circuit of the oscillator. It is well known to those skilled in the radio art that at higher frequencies, such as produced by our oscillator circuit, minute changes of inductance or capacity cause quite large changes in resonant frequencies of tuned circuits. Temperature variations cause inductance to vary and also cause changes in the resonant frequency of quartz and other electromechanical crystals. A typical crystal at present in use will change one cycle per mc. per degree centigrade change in temperature. This change may be plus or minus depending upon hiw the crystal was cut. We may modify the circuit of FIG. 14 as shown in FIG. 19 to compensate for temperature changes. By connecting the plate circuit of our oscillator circuit as shown in FIG. 19, the bypass condenser $C_7$ is chosen and the direction of its change of value upon change of temperature, and the value of its temperature coefficient, such as to compensate for the change of the inductance $L_2$ with temperature. By calculating or measuring the change in inductance with known temperature changes, and knowing the temperature coefficient of the crystal, the size and coefficient of $C_7$ may readily be determined. A temperature correcting condenser might be connected directly across $L_2$ of FIG. 5, but its value at the frequency involved would be very small and perhaps not so readily available as the arrangement shown at $C_7$ in FIG. 19.

A typical circuit in use at 78 mc. requires 5000 mmfd. as the value of $C_7$ of FIG. 19 with a temperature coefficient of .0007 mmfd. per mmfd. per degree centigrade to completely temperature compensate such a circuit. The resultant stability is approximately five parts per million cycles over a range of fifty degrees centigrade or about ten times better than that of the crystal itself at 10 mc.

The temperature compensating element might be connected across $L_1$ of FIG. 19, or across the $C_{gp}$ of the tube 22, or in parallel with the plate tank circuit, or in other places to secure the same result, the size of the element and its direction of compensation being chosen to the value of $C_1$ at the desired level in spite of temperature changes.

Figure 20:
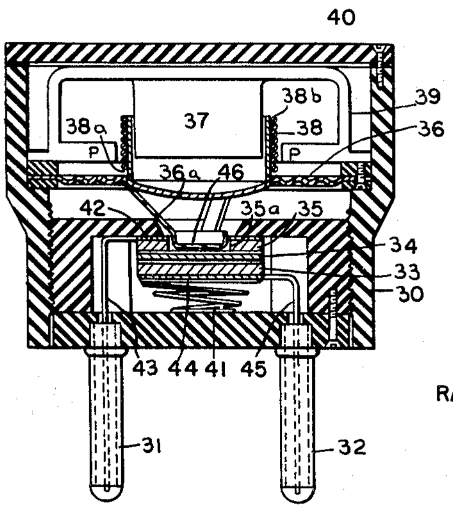
FIG. 20 is a central sectional view through a crystal holder having a movable part whereby to modify the capacitance of the crystal in its holder.

At FIG. 20, we show a means for modifying the capacitance of the crystal in its holder so as to affect $C_1$ by amounts sufficient to produce frequency modulation of the oscillator circuit. This crystal holder construction is an invention of George H. Lister and Ralph C. Blauvelt. The Bakelite holder 30 is provided with prongs 31 and 32 which are adapted to fit into a usual quartz crystal receiving socket in an FM set. In the base of the holder is a pocket to receive an electrode plate 33 above which is positioned the quartz crystal 34. Above the crystal is a second electrode plate 35 and these plates clamp the crystal at the corners only. In the middle of plate 35 is a one-quarter inch diameter opening **35*a*. Into this extends a nose 36*a* which is attached to the diaphragm 36 of a loudspeaker having a permanent magnet 37 with pole pieces P and a voice coil 38 with leads 38*a* and 38*b*. This speaker is held in position by spacers 39 and a cover 40. A coil spring 41 beneath the electrode plate 33 provides a resilient holder for the crystal. An electrode 42 engages plate 35 and is connected by wire 43 to prong 31. An electrode 44 engages plate 33 and is connected by wire 45 with prong 32**.

At the end of the nose **36*a* nearest the crystal is mounted a thin metal plate 46 which is 3/16 of an inch in diameter. It is the slight movement of this metal plate relative to the crystal, under the influence of the coil 38, which produces the frequency modulation. The plate 46 is positioned normally about five-thousandths of an inch from the surface of the crystal and its movements carry it in the range of four to six-thousandths with reference to the crystal. The crystal 34** has an AT cut but other crystals might be used.

The structure of FIG. 20 may be used for the crystal holder in FIG. 14. In this case, the modulator $X_M$ may be omitted. The circuit of FIG. 14 is tuned to $f_2$ (left side in FIG. 22) as taught herein, after which movement of the plate 42 of FIG. 20 will cause frequency modulation of the circuit of FIG. 14.

We find that this invention may be used to provide frequency modulation to all types of oscillators and is especially well adapted to produce frequency modulation of crystal oscillators. Sufficiently wide band frequency modulation may be obtained without the use of frequency multipliers. Such is not the case with phase modulation as is presently used. Furthermore the audio fidelity of our system is inherently good and does not require large numbers of frequency multipliers and corrective circuits in either receiver or transmitter to obtain excellent fidelity.

Equipment utilizing this invention has been operated on frequencies up to 470 mc. with only 6 times frequency multiplication to provide excellent communication. The frequency stability and audio fidelity have proven more than adequate for mobile operation over very rough terrain and during wide variations of temperatures and severe mechanical shock, over an area comparable to one of our largest cities.

What is claimed is:

1. The method of operating an oscillator circuit including a space charged tube having two electrodes effectively coupled by an electromechanical crystal in a holder, comprising connecting in parallel with said crystal an electrical value simulating an inductance of a value to cause said crystal at all times to exhibit the properties of an electrical capacitance in said circuit near the fundamental frequency of said crystal, and effectively coupling in said oscillator circuit a variable reactance and varying said reactance to produce direct frequency modulation of said oscillator circuit.

2. The method of operating an oscillator circuit including a space charged tube having two electrodes effectively coupled by an electromechanical crystal in a holder, comprising connecting in parallel with said crystal an electrical value simulating an inductance of a value to cause said crystal at all times to exhibit the properties of an electrical capacitance in said circuit near a selected overtone frequency of said crystal, and effectively coupling in said oscillator circuit a variable reactance and varying said reactance to produce direct frequency modulation of said oscillator circuit.

3. In the method of operating an oscillator circuit including a space charged tube having two electrodes effectively coupled by an electromechanical crystal in a holder and having an equivalent electrical capacity C and wherein said electrodes together with the crystal as a dielectric and the externally connected capacities cause a capacity $C_1$ to appear across the crystal terminals, the step of connecting in parallel with said crystal the electrical equivalent of an inductance having a value tuned relative to said capacity C to provide a circuit anti resonant to a frequency slightly below the series resonant frequency of said crystal at its *n*th overtone, the equivalent capacity of this tuned circuit at a frequency slightly above the series resonant frequency at said *n*th overtone forming a second circuit anti resonant with the equivalent inductance of said crystal at a frequency slightly above said *n*th overtone, then further reducing the effect of $C_1$ by decreasing the value of the added shunt inductance, plus the step of effectively coupling in said oscillator circuit a variable reactance and varying said reactance to produce direct frequency modification of said oscillator circuit.

4. In a tuned piezoelectric oscillator circuit comprising a space charge tube having control electrodes and a piezoelectric resonator effectively connected between two electrodes of said tube and having an output circuit, the electrical equivalent of an inductance connected in shunt with the terminals of said resonator, said equivalent of an inductance having a value tuned with the electrical capacity appearing across said piezoelectric terminals to anti resonate to a frequency slightly above the fundamental frequency of the piezoelectric resonator, and said output circuit tuned to anti resonate to a frequency below the fundamental frequency of the piezoelectric oscillator and as such to appear as a capacitive reactance of such magnitude as to cause the piezoelectric resonator to appear at all times as an equivalent capacitive reactance and to operate at a frequency slightly below the fundamental frequency of said resonator.

5. In a tuned piezoelectric oscillator circuit comprising a space charge tube having control electrodes and a piezoelectric resonator effectively connected between two electrodes of said tube and having an output circuit, the electrical equivalent of an inductance connected in shunt with the terminals of said resonator, said equivalent of an inductance having a value tuned with the electrical capacity appearing across said piezoelectric terminals to anti resonate to a frequency slightly above the $n$th overtone of the piezoelectric resonator, and said output circuit tuned to anti resonate to a frequency below the $n$th overtone of the piezoelectric oscillator and as such to appear as a capacitive reactance of such magnitude as to cause the piezoelectric resonator to appear at all times as an equivalent capacitive reactance and to operate at a frequency slightly below the $n$th overtone of said resonator.

6. A piezoelectric oscillator circuit operating at a frequency just slightly above the $n$th overtone of the piezoelectric resonator in which the inherent circuit capacity and externally connected capacity and crystal holder capacity are in shunt with the piezoelectric resonator, effectively coupled in shunt with said resonator an inductive reactance sufficient with said inherent circuit capacity and externally connected capacity and crystal holder capacity to anti resonate to a frequency slightly below the $n$th overtone, said anti resonant frequency of such a value that the equivalent capacitive reactance of said anti resonant circuit at a frequency just slightly above the $n$th overtone of said resonator is equal to the equivalent inductive reactance of said resonator at the said frequency just slightly above the $n$th overtone of said resonator, thus resulting in a second anti resonant circuit comprising the equivalent inductive reactance of said resonator and the equivalent capacitive reactance of said first anti resonant circuit, said second anti resonant circuit having sufficient tuned circuit impedance to permit resonator controlled oscillation to take place above the $n$th overtone of said resonator, and means for varying said inherent circuit capacity and externally connected capacity and crystal holder capacity to produce direct frequency modulation of said oscillator.

7. A piezoelectric oscillator circuit operating at a frequency just slightly above the $n$th overtone of the piezoelectric resonator in which the inherent circuit capacity and externally connected capacity and crystal holder capacity are in shunt with the piezoelectric resonator, effectively coupled in shunt with said resonator an inductive reactance sufficient with said inherent circuit capacity and externally connected capacity and crystal holder capacity to anti-resonate to a frequency slightly below the $n$th overtone, said anti resonant frequency of such a value that the equivalent capacitive reactance of said anti resonant circuit at a frequency just slightly above the $n$th overtone of said resonator is equal to the equivalent inductive reactance of said resonator at the said frequency just slightly above the $n$th overtone of said resonator, thus resulting in a second anti resonant circuit comprising the equivalent inductive reactance of said resonator and the equivalent capacitive reactance of said first anti resonant circuit, said second anti resonant circuit having sufficient tuned circuit impedance to permit resonator controlled oscillation to take place above the $n$th overtone of said resonator, and means for varying said effectively coupled inductive reactance in shunt with said crystal to produce direct frequency modulation of said oscillator.

8. In a crystal oscillator circuit having an electron discharge device with an input circuit provided with a predetermined effective capacity connected across a piezoelectric crystal and an output circuit including an impedance network; means for causing sustained oscillation of said oscillator circuit at an operating frequency below the series resonant frequency of said crystal comprising an inductive reactance connected in said input circuit in parallel with said crystal and effective to anti resonate with the inherent capacity of the crystal and the effective capacity of the input circuit at a preselected frequency above the series resonant frequency of said crystal, reactance means in said impedance network being conditioned to cause anti resonance for the latter at a peredtermined frequency below said series resonant frequency of said crystal, said anti resonant frequencies being selected and spaced above and below said series resonant frequency of the crystal such as to cause the equivalent inductance of said crystal to appear in the input circuit across the terminals of said crystal and wherein said crystal exhibits a capacitive reactance to said oscillator circuit.

9. In a crystal oscillator circuit as defined in claim 8 and wherein means are connected to the input circuit of said oscillator for varying said equivalent inductance of said crystal to produce direct frequency modulation of said oscillator.

References Cited in the file of this patent

UNITED STATES PATENTS

| | | |
|---|---|---|
| 1,953,140 | Trouant | Apr. 3, 1934 |
| 2,438,392 | Gerber | Mar. 23, 1948 |
| 2,613,320 | Panetta | Oct. 7, 1952 |

UNITED STATES PATENT OFFICE
CERTIFICATE OF CORRECTION

Patent No. 3,026,488 March 20, 1962

George H. Lister et al.

It is hereby certified that error appears in the above numbered patent requiring correction and that the said Letters Patent should read as corrected below.

Column 1, line 54, for "capacitance" read -- capacitive --; column 4, line 13, for "22+2+3+5=22 mmfd." read -- 22+2+3+5=32 mmfd. --; column 10, line 57, for "resistance" read -- reactance --.

Signed and sealed this 17th day of July 1962.

SEAL)
Attest:

ERNEST W. SWIDER
Attesting Officer

DAVID L. LADD
Commissioner of Patents